United States Patent
Won et al.

(10) Patent No.: US 10,136,481 B2
(45) Date of Patent: Nov. 20, 2018

(54) LIGHTING LAMP SYSTEM AND POWER DISTRIBUTOR USED FOR LIGHTING LAMP SYSTEM

(71) Applicants: DNCI CO., LTD., Bucheon-si, Gyeonggi-do (KR); TALBOT SOLUTIONS, LLC, Fort Lee, NJ (US)

(72) Inventors: Dong-mook Won, Seoul (KR); Cheol-Kyun Lee, Seoul (KR); Myung-Ki You, Goyang-Si (KR); Yunsil Park, Hawthorne, NY (US)

(73) Assignees: DNCI CO., LTD., Bucheon-si, Gyeonggi-do (KR); TALBOT SOLUTIONS, LLC, Fort Lee, NJ (US)

( * ) Notice: Subject to any disclaimer, the term of this patent is extended or adjusted under 35 U.S.C. 154(b) by 193 days.

(21) Appl. No.: 14/901,654

(22) PCT Filed: Jun. 23, 2014

(86) PCT No.: PCT/KR2014/005538
§ 371 (c)(1),
(2) Date: Dec. 28, 2015

(87) PCT Pub. No.: WO2014/208964
PCT Pub. Date: Dec. 31, 2014

(65) Prior Publication Data
US 2016/0157307 A1    Jun. 2, 2016

(30) Foreign Application Priority Data

Jun. 26, 2013 (KR) .................. 10-2013-0074051
Jun. 18, 2014 (KR) .................. 10-2014-0074357

(51) Int. Cl.
*H05B 33/08* (2006.01)
*H05B 37/02* (2006.01)
*H02J 9/06* (2006.01)

(52) U.S. Cl.
CPC ........... *H05B 33/0809* (2013.01); *H02J 9/06* (2013.01); *H02J 9/061* (2013.01);
(Continued)

(58) Field of Classification Search
CPC ........... H05B 33/0809; H05B 33/0815; H05B 33/0845; H02J 9/06; H02J 9/061
(Continued)

(56) References Cited

U.S. PATENT DOCUMENTS

2011/0140621 A1* 6/2011 Yi .................. H05B 33/0854
                                                        315/224
2011/0304211 A1* 12/2011 Peterson .............. G06F 1/263
                                                        307/48

FOREIGN PATENT DOCUMENTS

| JP | 2011-521407 A | 7/2011 |
| JP | 2012-070625 A | 4/2012 |
| KR | 10-2012-0087645 A | 8/2012 |

OTHER PUBLICATIONS

International Search Report and Written Opinion of the International Searching Authority for PCT Application No. PCT/KR2014/005538, dated Oct. 31, 2014, 23 pgs.

* cited by examiner

*Primary Examiner* — John Poos
(74) *Attorney, Agent, or Firm* — Ichthus International Law, PLLC

(57) ABSTRACT

The present invention relates to a lighting lamp system and a power distributor used for the lighting lamp system. The lighting lamp system comprising: a plurality of lighting lamps; a main converter for converting external alternating-current power into direct-current power; a distributor provided to be isolated from the lighting lamps and supplying power for lighting to the plurality of lighting lamps by converting the direct-current power from the main con-
(Continued)

verter; and a controller for controlling the operations of the lighting lamps by controlling the distributor.

17 Claims, 5 Drawing Sheets

(52) U.S. Cl.
CPC ..... *H05B 33/0815* (2013.01); *H05B 33/0845* (2013.01); *H05B 37/02* (2013.01); *H05B 37/0209* (2013.01); *Y02P 80/11* (2015.11)

(58) Field of Classification Search
USPC ...................................... 307/19, 22, 26, 157
See application file for complete search history.

LIGHTING LAMP SYSTEM AND POWER DISTRIBUTOR USED FOR LIGHTING LAMP SYSTEM

CROSS-REFERENCE TO RELATED APPLICATION

This application is a National Stage entry of International Application No. PCT/KR2014/005538, filed Jun. 23, 2014. The disclosure of the priority application is incorporated herein in its entirety by reference.

TECHNICAL FIELD

The present invention relates to a lighting lamp system and a power distributor used for the lighting lamp system.

BACKGROUND ART

In the related art, lighting lamps which have been widely used in homes or offices includes incandescent bulbs or fluorescent light bulbs. In the incandescent bulbs or fluorescent light bulbs, there are problems in that resources are wasted due to high power consumption and a negative effect on environmental protection occurs. In the incandescent bulbs, there are problems in that an environmental temperature is increased due to high electrical resistance heating of the filaments and use lifespan of the bulbs is short.

Accordingly, recently, light bulbs using a light emitting diode, which has low power consumption, is economic due to small-size, and may maximize a lighting effect due to various lightings and high visibility, have been developed and widely used.

In this case, the light emitting diode (hereinafter, referred to as an "LED") means a photoelectric conversion semiconductor device having a structure in which N-type semiconductor crystal of which a plurality of carriers are electrons and a P-type semiconductor crystal of which a plurality of carriers are holes are conjugated with each other. The LED means a semiconductor light emitting element using naturally emitted light generated when the electrons and the holes injected to a PN junction are recoupled.

Since such an LED has high photoelectric conversion efficiency (lumen/watt), power consumption is low as compared with incandescent bulbs or fluorescent light bulbs and since a preheating time is not required, lighting-on/off speeds are fast.

Further, the LED is strong against impact and stable because there is no gas or filament and has low power consumption by adopting a stable direct-current lighting method. Further, the LED performs a pulse operation and may reduce the fatigue of the optical nerve. Further, in the LED, use lifespan is semi-permanent, a lighting effect of various colors is represented, and miniaturization is possible.

However, the LED has a problem in that luminance and the use lifespan are degraded due to heat generated when an LED chip is driven.

In the case of most of LED type lighting lamps, and representatively, an incandescent bulb type lighting lamp in the related art, a converter which is a power supply module is installed in the lighting lamp itself. The converter itself causes generation of heat, and also is susceptible to the heat and has short lifespan. The LED chip constituting the LED type lighting lamp has a lifespan of about 60,000 hours, but the converter has only the lifespan of 15,000 hours.

Accordingly, even though the lifespan of the LED chip remains, when the lifespan of the converter comes to an end, it is disadvantageous to replace the lighting lamp or the entire light bulb. Actually, a power supply module ('a configuration included in the converter') including an electrolytic condenser having a short degradation and the like, that is, the power supply module is broken earlier than the LED chip in many cases.

Further, the power supply module is integrated or built-in the lighting lamp to the light bulb to become another cause of increasing the heat in the lighting lamp during driving. Further, the power supply unit mechanically occupies a predetermined space to degrade flexibility of design when the product is designed. Further, a power supply module (SMPS) has 20% or more of the weight of the lighting lamp and thus there is a problem in that the weight of the entire lighting lamp is increased.

Accordingly, in order to solve the problems, the power supply module is removed from the lighting lamp or the light bulb. And, in order to control a plurality of different LED lighting lamps at all times, a power supply device technique having a different concept from the existing power supply module which is integrated or built-in the LED lighting lamp is required.

As another representative LED type lighting lamp, there is a T-8 LED lighting lamp which is a rod fluorescent lighting type. In the case of the T-8, the power supply unit is a built-in type or an external type, and when a general fluorescent lighting is replaced with the LED lighting by using the T-8, each power supply module corresponding to each LED lighting needs to be separately installed. In this case, when a lighting fixture of the existing fluorescent lighting is used as it is, a wire connected to a ballast which has been installed in the lighting fixture is cut and the power supply module needs to be separately installed. That is, replacement cost may be additional generated, and furthermore, when the LED lighting is installed on the ceiling, workability is degraded.

Particularly, when replacement due to the failure of the power supply module is required after installation, electric capacity (voltage and current) required for each LED lighting lamp is different, and thus, replacement is impossible with a different specification other than the power supply device designated for each LED lighting lamp and thus the flexibility of the system management is degraded.

Therefore, in order to facilitate the system management and separately supply the electric capacity (voltage and current) required for any LED lighting lamp if necessary, a power distribution device having a different concept from the existing power supply device is required.

DISCLOSURE

Technical Problem

The present invention has been made in an effort to solve the problems. An object of the present invention is to provide a lighting lamp system and a power distributor used for the lighting lamp system. The present invention is to improve stability and lifespan of an LED lighting lamp, conveniently replaces a general lighting lamp with the LED lighting lamp, and easily replaces a power supply module that is a main cause of failure of the LED lighting lamp.

Further, the present invention has been made in an effort to solve the problems. And, an object of the present invention is to provide a lighting lamp system and a power distributor used for the lighting lamp system that may enlarge flexibility of the lighting design by removing a space which needs to accommodate a power supply module in a mechanical mechanism of the LED lighting lamp in the case of a bulb type.

Further, the present invention has been made in an effort to solve the problems. And, an object of the present invention is to provide a lighting lamp system and a power distributor used for the lighting lamp system that sets an upper value of current applied to the lighting lamp by a mechanical adjustor to prevent an upper value of the current from being changed by external hacking or malfunction due to an error of the program or accurately maintains the current upper value which is initially set even after power off recovery to improve stability and flexibility.

Other objects and advantages of the present invention can be understood by the following description and more apparently understood by exemplary embodiments of the present invention. Further, it can be easily understood that the objects and advantages of the present invention may be implemented by means illustrated in claims and a combination thereof.

Technical Solution

In order to achieve the object, the present invention proposes a lighting lamp system which includes a plurality of lighting lamps; a main converter for converting external alternating-current power into direct-current power; a distributor provided to be isolated from the lighting lamps and supplying power for lighting to the plurality of lighting lamps by converting the direct-current power from the main converter; and a controller for controlling the operations of the lighting lamps by controlling the distributor.

The distributor may include a rack having a plurality of partition spaces, a buck converter exchangeable installed in each partition space, receiving direct-current power from a main converter to each lighting lamp, and outputting the lighting power by stepping-down the received direct-current power, and an output port for connecting the converter and the lighting lamp.

The output port may include a first sub output port outputting first sub output power, and a second sub output port outputting second sub output power, and when the first sub output port and the second sub output port are connected, a sum power of the first sub output power and the second sub output power may be output.

The buck converter may include a voltage regulator stepping-down direct-current power from the main converter, a current regulator rectifying the direct-current power, and a dimming circuit dimming static current output from the current regulator to adjust brightness of the lighting lamp.

The distributor may further include a battery charged by the direct-current power from the main converter, and the controller may control the distributor to supply the lighting power by using the battery when the supply of external-alternating power is interrupted.

The distributor may further include an input unit for setting the lighting power, and a display unit for displaying a value set by the input unit and a measuring value of the power output from the output port.

The controller may control the lighting power by considering voltage drop according to a distance when the distance between the distributor and the lighting lamp is input through the input unit.

The buck converter may be installed to be separated from the rack.

The buck converter may include a buck converter for LED lighting bulbs, and a buck converter for general lighting bulbs.

The lamp may be a ceiling-mounted lamp and the distributor may be installed on an interior wall or a ceiling.

The lighting lamp system may further include a mechanical adjustor setting an upper value of the current applied to the lighting lamp, in which the controller may control the distributor to adjust the current value applied to the lighting lamp in the predetermined upper value range according to an applied current control signal to control the operation of the lighting lamp.

The mechanical adjustor may include N switches, and the upper values of the current limited by the N switches may be different from each other.

The lighting lamp system may further include a mechanical switch installed around the lighting lamp and generating for a signal for turning on/off the lighting power supplied to the lighting lamp, in which the controller may control the buck converter to supply the lighting power to the lighting lamp according to the on/off signal generated by the mechanical switch.

In order to achieve the object, the present invention proposes a power distributor for a lighting lamp system which includes a rack having a plurality of partition spaces; a buck converter exchangeable installed in each partition space, receiving direct-current power from a main converter to a corresponding lighting lamp among the plurality of lighting lamps, and outputting the lighting power of the lighting lamp by stepping-down the received direct-current power; and an output port for connecting the buck converter and the lighting lamp.

The buck converter may include a voltage regulator stepping-down direct-current power from the main converter, a current regulator rectifying the direct-current power, and a dimming circuit dimming static current output from the current regulator to adjust brightness of the lighting lamp.

The buck converter may further include a plurality of resistive terminals which may be connected with the output port, so as to adjust an output value of the lighting power output from the output port.

The power distributor for a lighting lamp system may further include a battery charged by the direct-current power from the main converter.

The power distributor for a lighting lamp system may further include an input unit for setting the lighting power; and a display unit for displaying a value set by the input unit and a measuring value of the power output from the output port.

The power distributor for a lighting lamp system may further include a buck controller controlling the buck converter to adjust the current value applied to the lighting lamp according to an applied current control signal in an upper value range of the current set by the mechanical adjustor; and an output port for connecting the buck converter and the lighting lamp to each other.

The buck controller may control the buck converter to supply the lighting power to the lighting lamp according to the on/off signal generated by a mechanical switch which is installed around the lighting lamp and generates a signal for turning on/off the lighting power supplied to the lighting lamp.

Advantageous Effects

According to the exemplary embodiment of the present invention having the aforementioned configuration, the LED lighting lamp and the power supply module are separated from each other to prevent the distributor as the power supply module from being damaged due to heat, an effect on the heat generated from the power supply module is removed to increase the lifespan of the LED lighting lamp and increase stability, and the power supply module is not attached to the lighting lamp to be conveniently installed according to reduction in weight of the LED lighting lamp, improve workability, and promote reduction in weight of the lighting lamp.

Further, according to the exemplary embodiment of the present invention, the distributor includes a plurality of exchangeable buck converters, and as a result, when capacity for each lighting lamp is different, maintenance is convenient.

Further, the upper value of the current applied to the lighting lamp is set by the mechanical adjustor to prevent malfunction in which the upper value of the current is arbitrarily changed by external hacking or an error of the program, and the setting of the upper value of the current may be accurately maintained even after power off recovery to ensure stability of the power distributor.

Further, since the system may operate by dividing a user environment, a manager environment, and an installer environment, when types and the number of LED lighting lamps need to be arbitrarily replaced with respect to the individual lighting, the system reconfiguration is convenient and the error of the system may be prevent. That is, the manager provides the user environment by inputting a control value for the individual lighting to the distributor according to a required environment of the user, and the user may easily control the lighting power supplied to the plurality of lamps by using the mechanical switch which is installed at a required position and generally used.

In the installer environment, unlike an existing LED lighting device using an AC power system, the lighting lamp system and the power distributor of the present invention use direct-current (DC) power of a maximum of 60 bolts, generally 50 bolts equal to or less other than alternating current (AC) which is an electric path from the main converter to reduce a risk of electric shock of the installer and the user while installing or replacing the LED lighting lamp.

BEST MODE

Hereinafter, a lighting lamp system and a power distributor used in the lighting lamp system according to an exemplary embodiment of the present invention will be described in more detail with reference to the accompanying drawings.

In this specification, an example in which the lighting lamp system according to the exemplary embodiment of the present invention is applied to an interior home is described, but the present invention is not limited thereto. It should be understood that the present invention may be applied to even an outdoor lighting system such as street lighting and security lighting system in addition to the indoor such as factories and offices.

Figure 1:
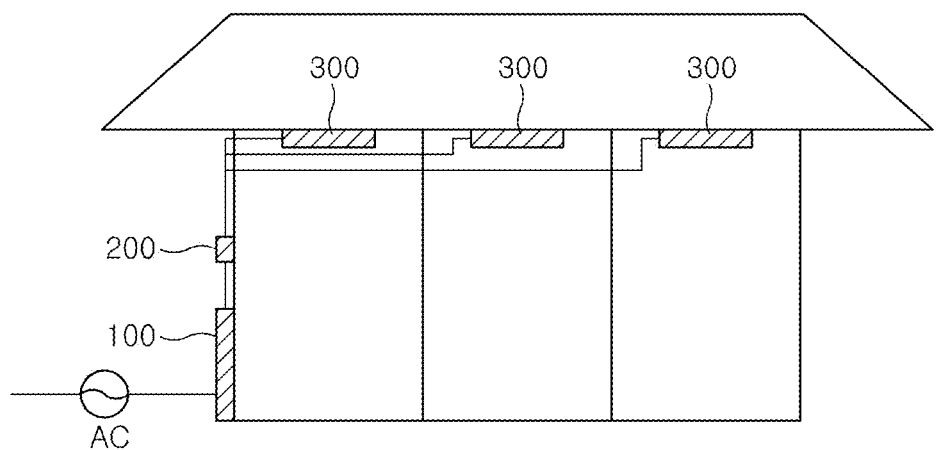
FIG. 1 is a diagram for schematically illustrating a lighting lamp system according to an exemplary embodiment of the present invention.

FIG. 1 is a diagram for schematically illustrating a lighting lamp system according to an exemplary embodiment of the present invention. As illustrated in FIG. 1, the lighting lamp system according to an exemplary embodiment of the present invention may be applied to indoor. In this case, the lighting lamp system may include an AC/DC converter (main converter) 100 which receives external commercial power of 110 V or 220 V to convert the received commercial power to direct-current power, a distributor 200 for supplying static-current power to a lighting lamp 300 by receiving the direct-current power which is converted by the main converter 100, and a lamp 300 emitting light by the power supplied from the distributor 200.

In this case, the lamp 300 may be a ceiling-mounted lamp as a light emitting diode (LED) lamp. That is, the lamp 300 may be a ceiling-mounted LED lamp which is installed in each room or living room. In addition, the power distributor 200 supplying the power to the LED lamp may include a plurality of buck converters 250 that supplies the power for each lamp.

The plurality of lamps 300 may be the same as or different from each other.

Figure 7A:
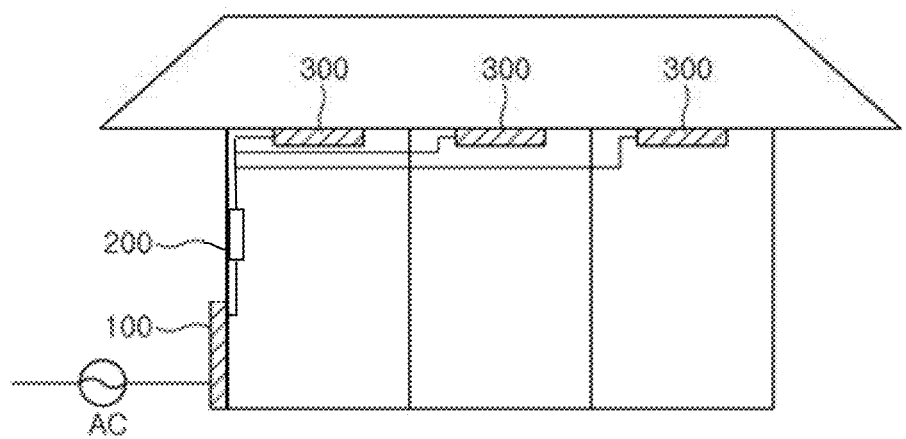
FIGS. 7A and 7B are diagrams for conceptually illustrating a lighting lamp system according to an exemplary embodiment of the present invention.
Figure 7B:
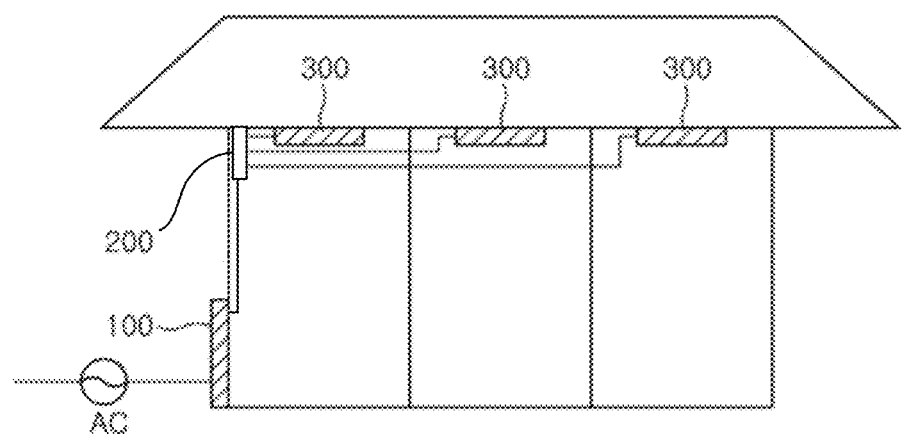

In the exemplary embodiment, the lamp 300 is limited to the ceiling-mounted type, but of course, the lamp may be installed at other places such as a wall. Further, as shown in FIGS. 7A and 7B, the distribution 200 may be installed on an interior wall or a ceiling.

As such, according to the exemplary embodiment of the present invention, since a separate power supply module needs not to be attached to the ceiling-mounted LED lamp 300, construction is convenient when replacing existing fluorescent light bulbs. Further, since the distributor 200 is isolated from the LED lamp with much heating by distance, there is no degradation and thus, durability of the distributor 200 and the lighting system itself may be improved.

Hereinafter, a detailed configuration of the lighting lamp system having the aforementioned configuration will be described in more detail in FIG. 2.

Figure 2:
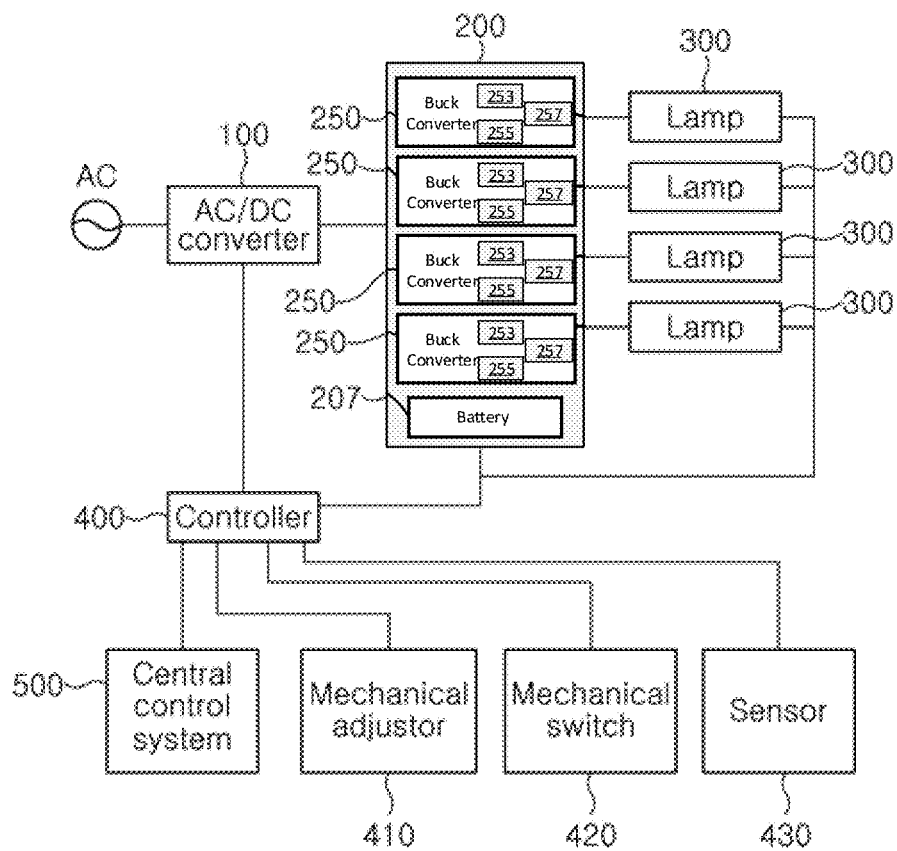
FIG. 2 is a block configuration diagram for describing an electronic configuration of the lighting lamp system according to the exemplary embodiment of the present invention.

FIG. 2 is a block configuration diagram for describing an electronic configuration of the lighting lamp system according to the exemplary embodiment of the present invention.

In the exemplary embodiment, an example in which the buck converters 250 are controlled by the controller 400 will be described. In this case, the controller 400 may be formed inside or outside the distributor 200.

As illustrated in FIG. 2, the lighting lamp system according to the present invention may comprise the AC/DC converter 100, the distributor 200, the lamp 300, the controller 400, a mechanical adjustor 410, a mechanical switch 420, and a central control system 500.

The AC/DC converter 100 is a component which converts alternating-current commercial power to direct-current power. Since the general LED lamp is driven by the direct-current power, first, it is required to convert the alternating-current power to the direct-current power.

The distributor 200 is a component for supplying proper static-current power to the plurality of LED lamps 300 which is installed at the respective rooms, as illustrated in FIG. 2. As illustrated in FIG. 2, the distributor 200 may be constituted by including buck converters 250 which are equal to or smaller than the number of LED lamps 300 and the battery 207. The buck converter 250 as a step-down converting circuit is a circuit used when output voltage is lower than input voltage and functions to supply lighting power to the corresponding lamp 300.

A plurality of distributors 200 may be present, and the distributors 200 may be connected to each other in series or in parallel. A plurality of lamps 300 may be connected to the respective distributors 200. As such, the distributor 200 may be extended.

The buck converter 250 includes a voltage regulator 253 which steps-down the direct-current power from the main converter 100, a current regulator 255 rectifying the direct-current power, and a dimming circuit 257 which adjusts brightness of the lighting lamp 300 by dimming static current output from the current regulator 255 to supply the lighting power to the lamp 300.

In addition, the battery 207 is a component for turning on the lamp 300 at the emergency for a predetermined time when the supply of the alternating-current commercial power is limited. That is, when the controller 400 determines that the supply of the direct-current power is not normally performed in the AC/DC converter 100, the power generated in the battery 207 is supplied to the buck converter 250 and thus the lamp 300 is lighted. In this case, the power is supplied by only minimum current set so that the lighting of the lamp 300 is performed for a long time, and thus, the lamp 300 may be minimally lighted. The configuration of the distributor 200 will be described in more detail in FIG. 3.

The lamp 300 as a ceiling-mounted LED is lighted by the power from the buck converter 250. That is, the LED emits the light by using the static direct-current power, and in the present invention, since a separate power supply module needs not to be integrated or built in the lamp 300, the lamp 300 may be constituted only by an LED substrate without a power supply module and a housing.

The controller 400 controls the operation of the battery 207 as described above, and is connected with the lamp 300 to verify whether the lamp 300 is normally operated. Further, output voltage and output current of the buck converter 250 serve to be set by a control of the central control system 500 (for example, a home automation system) to be described below. Further, when the distance between the distributor 200 and the lighting lamp 300 is input through the user input unit 211, the controller 400 may control the lighting power by considering voltage drop according to the distance. That is, when the lamp 300 is installed indoor, the distance between the distributor 200 and the lamp 300 is increased, and thus, when the voltage drop occurs, values which are lower than originally required voltage and current (that is, rated voltage and current) are actually supplied to the lamp 300. By considering it, in the present invention, when the distance between the distributor 200 and the lamp 300 is input through the user input unit 211, the controller 400 automatically adjusts the predetermined voltage of the buck converter 250.

The mechanical adjustor 410 may set an upper value of the current applied to the lamp 300. For example, the mechanical adjustor 410 may comprises N switches, and upper values of the current limited by the N switches may be different from each other. For example, the upper value of current set by the first switch is a value corresponding to 10% of a current maximum value that is able to output in the buck converter 250. The upper value of current set by the second switch may be a value corresponding to 20% of a current maximum value which is able to output in the buck converter 250. According to such a method, the upper values of the current set by the N switches may be different set. The upper values set by the switches may be variously set according to the user's or manufacturer's convenience. The detailed description thereof will be described below in detail in FIG. 4.

As another example, the mechanical adjustor 410 may be a rotary switch of which a contact point varies according to rotation. For example, when the rotary switch rotates to contact four contact points, the upper value of the current corresponding to the first contact point is a value corresponding to 10% of a current maximum value that is able to output in the buck converter 250. A value of current corresponding to the second contact point may be a value corresponding to 20% of a current maximum value that is able to output in the buck converter 250. According to such a method, the upper values of the current set by the N switches may be different set. The upper values set by the switches may be variously set according to the user's or manufacturer's convenience.

In addition to the mechanical adjustor described above, various types of mechanical devices may be used.

The controller 400 controls the distributor 200 to adjust a current value applied to the lamp 300 within a predetermined upper value range according to an applied current adjust signal.

As such, the upper value of the current applied to the lighting lamp is set by the mechanical adjustor, and thus, the upper value of the current is changed by external hacking or the setting of the current upper value may be accurately maintained even after power off recovery to prevent the power distributor from malfunctioning.

The mechanical switch 420 is installed around the lamp 300 and may generate a signal which may turn on/off the lighting power supplied to the lamp 300. For example, the mechanical switch 420 may be an on/off switch. Further, the mechanical switch 420 may be installed on any wall which is present around a place where the lamp 300 is installed.

The controller 400 may control the buck converter 250 to supply the lighting power to the lamp 300 according to the on/off signal generated by the mechanical switch 420. For example, when the signal for turning on the lighting power supplied to the lamp 300 from the mechanical switch 420 is generated, the controller 400 may control the buck converter 250 to supply the lighting power to the lamp 300.

The controller 400 may group the mechanical switch 420 and the lamp 300 according to a setting signal. For example, it is assumed that the setting signal groups three lamps in a region A with the first mechanical switch and groups four lamps in a region B with the second mechanical switch. When the setting signal is input, the controller 400 sets the three lamps in a region A and the first mechanical switch as a first group and sets the four lamps in a region B and the second mechanical switch as a second group.

Accordingly, the user may easily set the lighting power supplied to the lamp 300 by using the mechanical switch 420 installed around the lamp 300, without going to the place where the distributor 200 is installed.

The sensor 430 may recognize motion of an object or sense an illumination value. For example, the sensor 430 may be a sensor sensing the motion, a sensor measuring the illumination value, and the like.

The controller 400 may be control the lamp 300 based on the sensing value generated in the sensor 400. For example, when the sensor 430 generates a sensing value sensing the motion of the object in a first region, the controller 400 may turn on the lamp 300 which may illuminate the first region. On the contrary, when the sensor 430 generates a sensing value sensing that there is no motion of the object in the first region, the controller 400 may turn off the lamp 300 which illuminates the first region.

As yet another example, when the illumination value sensed in the sensor 430 is smaller than a predetermined illumination value, the controller 400 may turn on the set lamp 300. On the contrary, when the illumination value sensed in the sensor 430 is larger than the predetermined illumination value, the controller 400 may turn off the set lamp 300.

As such, based on the sensing value sensed in the sensor, the controller actively controls the lamp to more efficiently control the lamp.

The central control system 500 is connected with the controller 400 to set output voltage and output current of the buck converter 250. Accordingly, in the case of replacing the lamp with the lamp 300 with different output voltage and current (for example, like a case of replacing the fluorescent light bulb to the LED lighting), when the output voltage and current are reset in the central control system 500, the controller 400 resets the output voltage and current of the buck converter 250, and thus the replaced LED lighting may normally operate. In this case, the central control system 500 and the controller 400 may be connected to each other through a TCP/IP protocol.

Figure 3:
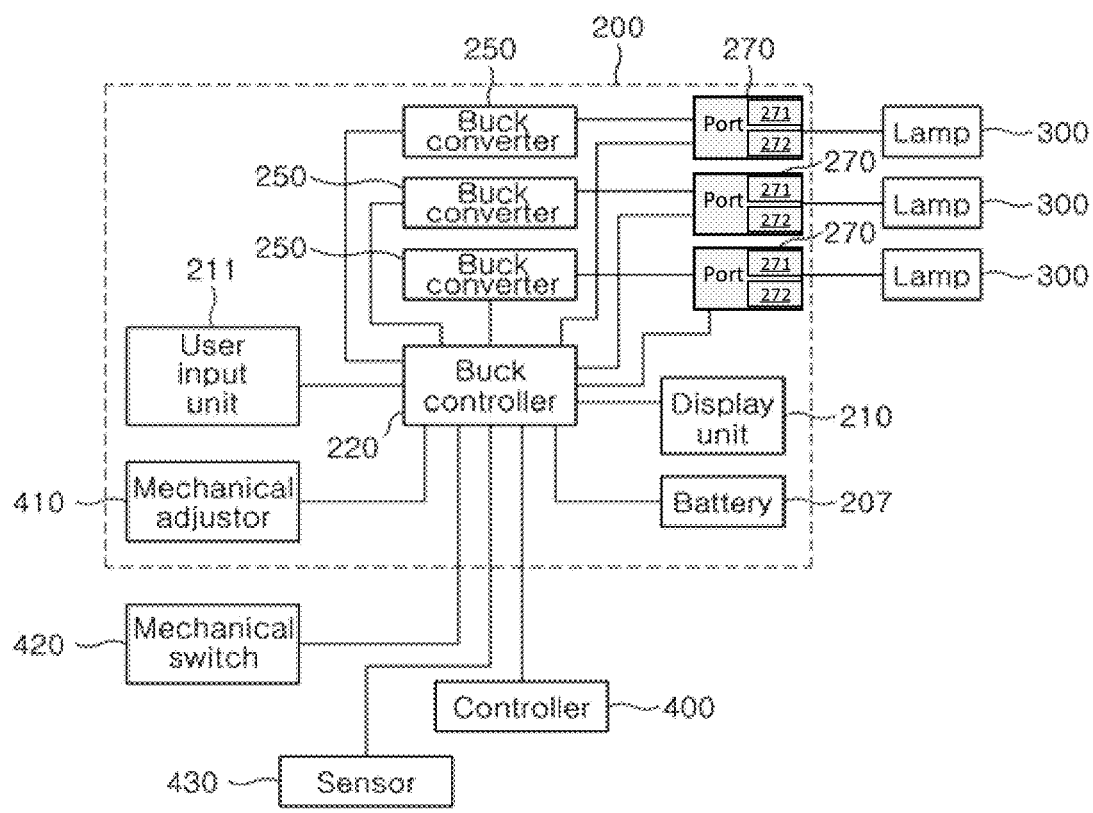
FIG. 3 is a block configuration diagram for describing an electronic configuration of a distributor in the lighting lamp system according to the exemplary embodiment of the present invention.

FIG. 3 is a block configuration diagram for describing an electronic configuration of the distributor 200 in the lighting lamp system according to the exemplary embodiment of the present invention.

In the exemplary embodiment, the buck converter 250 is controlled by a buck controller 220 and the controller 400 may control the buck controller 220. In this case, the controller 400 may be included in a fixed or portable terminal.

As illustrated in FIG. 3, the distributor 200 may include a plurality of buck converters 250 which is connected with the lamp 300, respectively, a battery 207, a display unit 210, a user input unit 211, a buck controller 220, and a mechanical adjustor 410.

For simplification of description, the description for the part described in FIG. 2 will be omitted.

Figure 5:
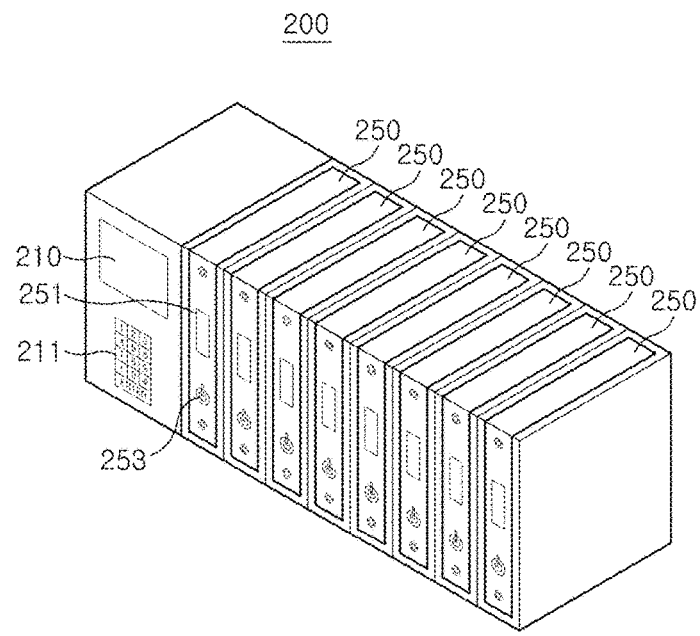
FIG. 5 is a back perspective diagram of the distributor for describing an output port (a power supply port) in the lighting lamp system according to the exemplary embodiment of the present invention.

The output port 270 is a component for connecting the buck converter 250 and the lamp corresponding to the buck converter 250. The output port 270 may be disposed on a rear surface of the distributor 200 as illustrated in FIG. 5. Various output power may be supplied by using the output port 270. This will be described in detail in FIG. 5.

Figure 4:
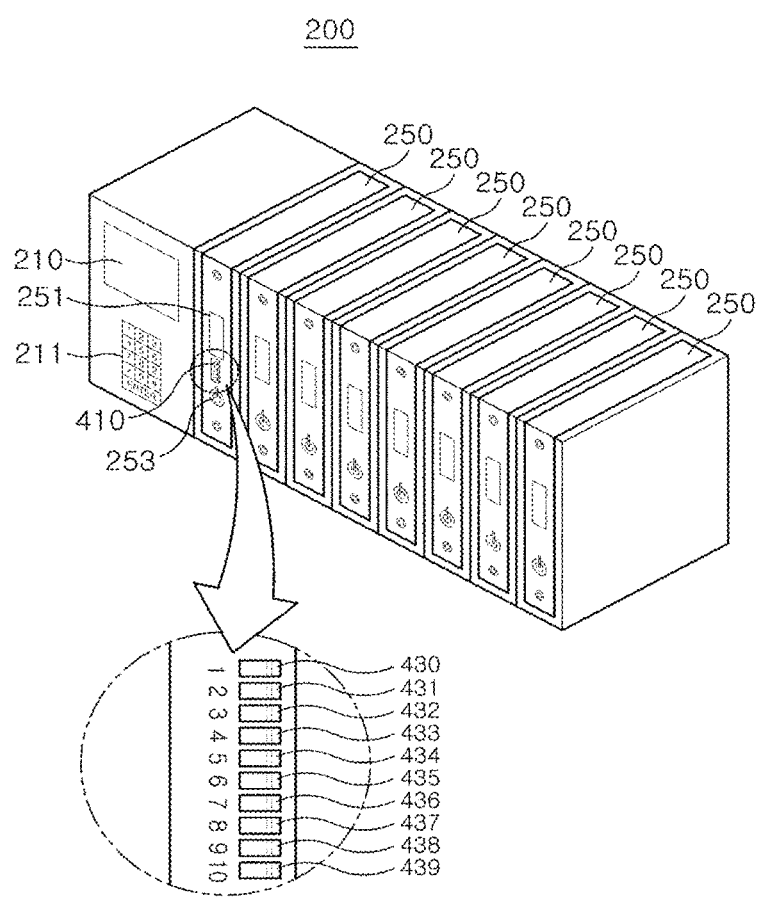
FIG. 4 is a diagram for schematically illustrating an appearance of the distributor in the lighting lamp system according to the exemplary embodiment of the present invention.

The display unit 210 is a component for displaying an output voltage value set by the user input unit and, an output voltage value and an output current value which are actually output from the port, as illustrated in FIG. 4. Here, the user input unit may be a knob 253 installed for each buck converter and may be a user input unit 211 installed in the distributor 200 itself.

Meanwhile, the buck controller 220 is connected with the port 270 to verify the measured output voltage and current values and controls the measured output voltage and current values to be displayed on the display unit 210 together with the output voltage and current values set by the controller 400.

The mechanical adjustor 410 may set an upper value of the current applied to the lamp 300. The mechanical adjustor 410 is included in the distributor 200 or may be separately formed.

The buck controller 220 controls the buck converter 250 to adjust a current value applied to the lamp 300 within a predetermined upper value range according to an applied current adjust signal to control the operation of the lamp 300.

The mechanical switch 420 is installed around the lamp 300 and may generate a signal which may turn on/off the lighting power supplied to the lamp 300. For example, the mechanical switch 420 may be installed on a wall which is present around a place where the lamp 300 is installed.

The buck controller 220 may control the buck converter 250 to supply the lighting power to the lamp 300 according to the on/off signal generated by the mechanical switch 420.

The controller 400 receives the predetermined value for the lighting lamp system to input the received value to the buck controller 220. The predetermined value for the lighting lamp system may be input through a user input unit (not illustrated) connected with the controller 400. For example, the controller 400 may be a configuration included in a computer. After connecting the computer and the distributor 200, the user may input a desired predetermined value through the computer. In this case, the controller 400 of the computer may apply the input predetermined value to the buck controller 220. The buck controller 220 stores the input predetermined value and may control the connected components according to the input predetermined value. After the predetermined value is input to the buck controller 220, the user or the system manager may separate the computer and the distributor 200 from each other. As such, the user may input the predetermined value by connecting the computer and the distributor 200 if necessary.

Alternatively, the user may input the predetermined value for the lighting lamp system through the user input unit 211. The buck controller 220 stores the input predetermined value and may control the connected components according to the input predetermined value.

Hereinafter, an appearance of the distributor 200 having the aforementioned configuration will be described in detail with reference to FIG. 4.

FIG. 4 is a diagram for describing an appearance of the distributor 200 in the lighting lamp system according to the exemplary embodiment of the present invention. As illustrated in FIG. 4, the distributor 200 includes a rack having a plurality of partition spaces, and the buck converter 250 which is exchangeable installed is installed in each partition space. In the buck converter 250, a buck converter switch 251 controlling the operation and a knob 253 for adjusting the output current and voltage are installed on one surface, and an output port 270 (not illustrated) is installed on a rear surface. The buck converter switch 251 controls on/off of the buck converter 250.

The mechanical adjustor 410 may set an upper value of the current applied to the lamp 300. For example, the mechanical adjustor 410 may be constituted by N switches 430 to 439, and upper values of the current limited by the N switches 430 to 439 may be different from each other. For example, an upper value of current set by the first switch 430 is a value corresponding to 10% of a current maximum value which is able to output in the buck converter 250, and an upper value of current set by the second switch 431 may be a value corresponding to 20% of a current maximum value which is able to in the buck converter 250. Upper values of the third switch 432 to the ninth switch 438 have the upper values of the current at the same distance. Finally, the upper value of the current set by the tenth switch 439 has a value corresponding to 100% of the current maximum value which is able to output in the buck converter 250.

As a result, the user, the manager, or the like may mechanically set the upper value of the current applied to the lamp by using the mechanical adjustor 410.

According to such a method, the upper values of the current set by the N switches may be different set. The upper values set by the switches may be variously set according to the user's or manager's convenience.

Here, the knob 253 is a component for varying a resistance value, and as the knob 253 rotates in one direction, the resistance value connected with the output port varies, and as a result, the output voltage and the output current are changed. The appropriate power (voltage and current) may be supplied to various kinds of lamps 300 by using the knob 253.

Instead of the knob, a plurality of resistive terminals (not illustrated) may be attached to a substrate (that is, a substrate with the voltage regulator, the current regulator, and the dimming circuit) of the buck converter 250. The resistive terminals are constituted to be connected with the output port 270. A designer may adjust the output current by combining the resistive terminals to be suitable for an input power value of the corresponding lamp.

The buck converter 250 serves to supply the power to the corresponding lamp 300 with the predetermined voltage and power as illustrated in FIGS. 1 to 3.

Meanwhile, the display unit 210 for displaying the predetermined output voltage and current and the measured output voltage and current is installed at one side of the distributor 200 and the user input unit 211 is installed therebelow to set the output voltage and current instead of the knob 253.

Meanwhile, the buck converter 250 is detachably installed while sliding in the partition space of the rack. Accordingly, when the buck converter 250 is out of order, only the disordered component is replaced to normally repair the entire lighting system, and thus, replacement cost and management cost may be significantly reduced.

Further, the output of the buck converter 250 may be set to the knob 253 installed in the buck converter 250 or an input device installed in the distributor, and thus, the output of the buck converter 250 may be conveniently set without a separate central control system 500.

Hereinafter, the output port 270 installed in the converter or the distributor 200 will be described with reference to FIG. 5.

FIG. 5 is a back perspective view of the distributor for describing an output port (a power supply port) in the lighting lamp system according to the exemplary embodiment of the present invention. As illustrated in FIG. 5 and FIG. 3, the output port 270 installed on the back side of each buck converter 250 may include a first sub output port 271 and a second sub output port 272.

By the buck converter 250, as shown in FIG. 3 and FIG. 5, the first sub output port 271 may output predetermined first sub output power and the second sub output port 272 may output second sub output power.

The first sub output power and the second sub output power may be different from each other. Accordingly, when the lamp 300 is installed, a sub output port suitable for an input power value of the lamp 300 is determined, and the lamp 300 and the distributor 200 may be connected to each other by connecting a connection port of the lamp 300 to the sub output port. When the input power of the lamp 300 is the same as a sum of the first sub output power and the second sub output power, the first sub output port 271 and the second sub output port 272 are connected with the lamp 300 by using a specific gender. As a result, the sum power of the first sub output power and the second sub output power is output.

Alternatively, the sum power may be output by combining the respective output ports 270. That is, two or more output ports 270 are simultaneously connected to the corresponding lamp 300 to supply the sum power to the lamp 300.

Through the above configuration, it is easy to respond to the lamp requiring various input power.

In the exemplary embodiment, two sub output ports are descried as an example, but the present invention is not limited thereto, and various output power may be provided by using three or more sub output ports.

Figure 6:
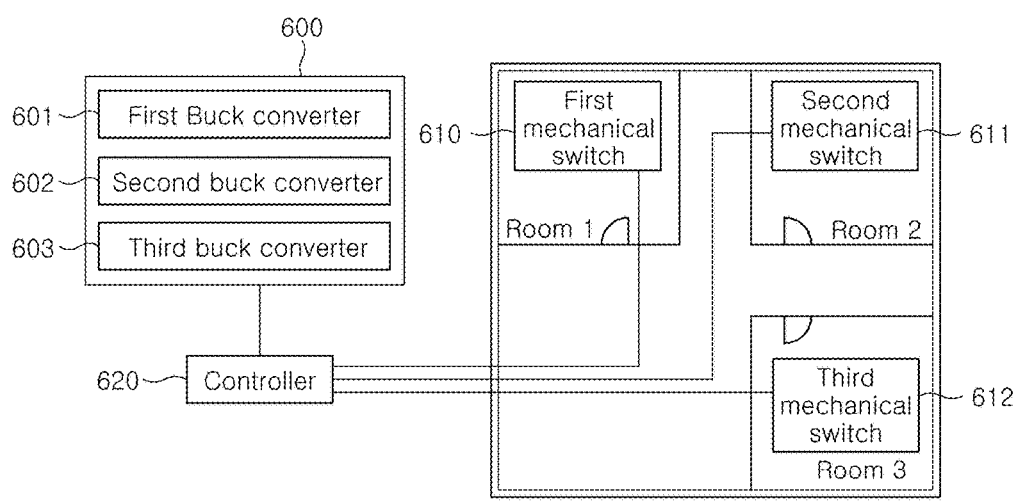
FIG. 6 is a diagram for describing a lighting lamp system according to another exemplary embodiment of the present invention.

FIG. 6 is a diagram for describing a lighting lamp system according to another exemplary embodiment of the present invention.

As illustrated in FIG. 6, a lighting lamp system according to the present invention includes a distributor 600, mechanical switches 610, 611, and 612, and a controller 620.

In the exemplary embodiment, a case where the controller 620 is constituted to be separated from the distributor 600 will be described, but of course, the controller 620 may be formed in the distributor 600.

The distributor 600 is a component for supplying proper static-current power to a plurality of LED lamps (not illustrated) which is installed at the respective rooms.

The distributor 600 may include a first buck converter 601, a second buck converter 602, and a third buck converter 603. The first buck converter 601 may supply lighting power to lamps installed in room 1, the second buck converter 602 may supply lighting power to lamps installed in room 2, and the third buck converter 603 may supply lighting power to lamps installed in room 3.

The first mechanical switch 610 may be installed around the lamps installed in room 1 and generate a signal which may turn on/off the lighting power supplied to the lamp.

For example, when the signal for turning off the lighting power supplied to the lamp is generated in the first mechanical switch 610, the controller 620 may control the first buck converter 601 so as not to supply the lighting power to the lamp.

As another example, when the signal for turning on the lighting power supplied to the lamp is generated in the second mechanical switch 611, the controller 620 may control the second buck converter 602 so as to supply the lighting power to the lamp.

As a result, the user may easily control the lighting power supplied to the lamps which are positioned in room 1, room 2, and room 3, respectively, by using the mechanical switches 610, 611, and 612 installed around the lamps, without going to the place where the distributor 600 is installed.

According to the exemplary embodiment of the present invention having the aforementioned configuration, the lighting lamp and the power supply module are isolated from each other to prevent the distributor as the power supply module from being damaged due to heat, thereby increasing the lifespan of the lighting lamp. Since the power supply module is not attached to the lighting lamp, in the case where the lighting lamp is a ceiling-mounted type, stability may be increased, installation is convenient, and reduction in weight of the lighting lamp may be promoted.

Further, according to the exemplary embodiment of the present invention, the distributor includes a plurality of exchangeable buck converters, and as a result, when capacity for each lighting lamp is different, maintenance is convenient.

In the lighting lamp system and the power distributor used for the lighting lamp system described above, the configurations and the methods of the exemplary embodiments described above may not be limited. All or some of the exemplary embodiments may be selectively combined so that the exemplary embodiments may have various modifications.

The invention claimed is:

1. A lighting lamp system comprising:
   a plurality of lighting lamps;
   a main converter for converting external alternating-current power into direct-current power;
   a distributor provided to be isolated from the lighting lamps and for supplying power for lighting to the plurality of lighting lamps by converting the direct-current power from the main converter; and
   a controller for controlling operations of the plurality of lighting lamps by controlling the distributor,
   wherein the distributor includes a rack having a plurality of partition paces; a buck converter replaceably installed in each partition space, receiving the direct-current power from the main converter to each lighting lamp, and outputting the lighting power by stepping-down the received direct-current power; and an output port for connecting the buck converter and the lighting lamp; and
   wherein the output port includes a first sub output port configured to output first sub output power, and a second sub output port configured to output second sub output power, and when the first sub output port and the second sub output port are connected, a sum of the first sub output power and the second sub output power is output.

2. The lighting lamp system of claim 1, wherein the buck converter includes:
   a voltage regulator for stepping-down the direct-current power from the main converter,
   a current regulator for rectifying the direct-current power, and
   a dimming circuit for dimming static current output from the current regulator to adjust brightness of a lighting lamp.

3. The lighting lamp system of claim 1, wherein the distributor further includes a battery charged by the direct-current power from the main converter, and the controller controls the distributor to supply the lighting power by using the battery when a supply of external-alternating power is interrupted.

4. The lighting lamp system of claim 1, wherein the distributor further includes an input unit for setting the lighting power; and a display unit for displaying a value set by the input unit and a measuring value of the power output from the output port.

5. The lighting lamp system of claim 4, wherein the controller is configured to control the lighting power by considering a voltage drop according to a distance when the distance between the distributor and the lighting lamp is input through the input unit.

6. The lighting lamp system of claim 1, wherein the buck converter is installed to be capable to separate from the rack.

7. The lighting lamp system of claim 1, wherein the buck converter comprises a first buck converter for LED lighting bulbs and a second buck converter for general lighting bulbs.

8. The lighting lamp system of claim 1, wherein the lamp is a ceiling-mounted lamp and the distributor is installed on an interior wall or a ceiling.

9. A lighting lamp system comprising:
   a plurality of lighting lamps;
   a main converter for converting external alternating-current power into direct-current power;
   a distributor provided to be isolated from the lighting lamps and supplying power for lighting to the plurality of lighting lamps by converting the direct-current power from the main converter; and
   a mechanical adjustor for setting an upper value of the current applied to the lighting lamp,
   wherein the controller is configured to control the distributor to adjust the current value applied to the lighting lamp in a predetermined upper value range according to a current control signal to control operation of one or more of the lighting lamps.

10. The lighting lamp system of claim 9, wherein the mechanical adjustor includes a plurality of switches, and upper values of current limited by the plurality of switches are different from each other.

11. The lighting lamp system of claim 1, further comprising:
    a mechanical switch installed near the lighting lamp and for generating a signal for turning on/off the lighting power supplied to the lighting lamp,
    wherein the controller is configured to control the buck converter to supply the lighting power to the lighting lamp according to a turn on/off signal generated by the mechanical switch.

12. A power distributor for a lighting lamp system comprising:
    a rack having a plurality of partition spaces;
    a buck converter replaceably installed in each partition space, the buck converter being configured to receive direct-current power from a main converter to a corresponding lighting lamp among the plurality of lighting lamps, and output lighting power of the lighting lamp by stepping-down the received direct-current power;
    a buck controller for controlling the buck converter to adjust a current value applied to the lighting lamp according to a current control signal in an upper value range of the current set by a mechanical adjustor; and
    an output port for connecting the buck converter and the lighting lamp, respectively.

13. The power distributor of claim 12, wherein the buck converter includes:
    a voltage regulator for stepping-down the direct-current power from the main converter,
    a current regulator for rectifying the direct-current power, and
    a dimming circuit for dimming static current output from the current regulator to adjust brightness of the lighting lamp.

14. The power distributor of claim 13, wherein the buck converter further includes a plurality of resistive terminals which may be connected with the output port, so as to adjust an output value of the lighting power output from the output port.

15. The power distributor of claim 12, further comprising:
a battery charged by the direct-current power from the main converter.

16. The power distributor of claim 12, further comprising:
an input unit for setting the lighting power; and
a display unit for displaying a value set by the input unit and a measuring value of the power output from the output port.

17. The power distributor of claim 12, wherein the buck controller is configured to control the buck converter to supply the lighting power to the lighting lamp according to a signal generated by a mechanical switch which is installed near the lighting lamp and generates a signal for turning on/off the lighting power supplied to the lighting lamp.

* * * * *